United States Patent
Melamed et al.

(10) Patent No.: US 10,199,035 B2
(45) Date of Patent: Feb. 5, 2019

(54) MULTI-CHANNEL SPEECH RECOGNITION

(71) Applicant: Nuance Communications, Inc., Burlington, MA (US)

(72) Inventors: Ilya Dan Melamed, New York, NY (US); Andrej Ljolje, Morris Plains, NJ (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 237 days.

(21) Appl. No.: 14/087,885

(22) Filed: Nov. 22, 2013

(65) Prior Publication Data
US 2015/0149162 A1    May 28, 2015

(51) Int. Cl.
*G10L 15/07* (2013.01)
*G10L 15/20* (2006.01)
*G10L 15/22* (2006.01)
*G10L 15/28* (2013.01)

(52) U.S. Cl.
CPC .............. *G10L 15/07* (2013.01); *G10L 15/20* (2013.01); *G10L 15/28* (2013.01); *G10L 2015/227* (2013.01)

(58) Field of Classification Search
CPC ....... G10L 15/00; G10L 15/065; G10L 15/07; G10L 25/78
USPC .......................... 704/215, 231, 250, 255, 256
See application file for complete search history.

(56) References Cited

U.S. PATENT DOCUMENTS

| | | | |
|---|---|---|---|
| 5,400,409 A | | 3/1995 | Linhard |
| 5,477,451 A | * | 12/1995 | Brown ................ G06F 17/2755 704/2 |
| 6,073,101 A | * | 6/2000 | Maes .................... G10L 15/065 704/231 |
| 6,810,116 B1 | | 10/2004 | Sorensen et al. |
| 7,392,189 B2 | | 6/2008 | Hennecke et al. |
| 7,505,901 B2 | | 3/2009 | Kaltenmeier et al. |

(Continued)

FOREIGN PATENT DOCUMENTS

| | | |
|---|---|---|
| JP | 2000322087 | 11/2000 |
| KR | 2011061267 | 6/2011 |

OTHER PUBLICATIONS

Dines. John, Jithendra Vepa, and Thomas Hain, "The segmentation of multi-channel meeting recordings for automatic speech recognition," Interspeech, 2006.

*Primary Examiner* — Richemond Dorvil
*Assistant Examiner* — Rodrigo A Chavez

(57) ABSTRACT

Systems, methods, and computer-readable storage devices for performing per-channel automatic speech recognition. An example system configured to practice the method combines a first audio signal of a first speaker in a communication session and a second audio signal from a second speaker in the communication session as a first audio channel and a second audio channel. The system can recognize speech in the first audio channel of the recording using a first model specific to the first speaker, and recognize speech in the second audio channel of the recording using a second model specific to the second speaker, wherein the first model is different from the second model. The system can generate recognized speech as an output from the communication session. The system can identify the models based on identifiers of the speakers, such as a telephone number, an IP address, a customer number, or account number.

16 Claims, 5 Drawing Sheets

(56) References Cited

U.S. PATENT DOCUMENTS

| | | | |
|---|---|---|---|
| 7,953,590 B2* | 5/2011 | Gao | G06F 17/289 |
| | | | 704/2 |
| 8,270,606 B2 | 9/2012 | Caskey et al. | |
| 8,880,406 B2* | 11/2014 | Santos-Lang | G10L 15/22 |
| | | | 434/169 |
| 9,031,839 B2* | 5/2015 | Thorsen | G10L 15/183 |
| | | | 704/235 |
| 9,208,779 B2* | 12/2015 | Sak | G10L 15/197 |
| 2004/0185839 A1* | 9/2004 | Seligmann | H04M 1/006 |
| | | | 455/417 |
| 2005/0137866 A1* | 6/2005 | Dow | G10L 15/26 |
| | | | 704/244 |
| 2005/0171926 A1* | 8/2005 | Thione | G06F 17/24 |
| 2006/0143007 A1 | 6/2006 | Koh et al. | |
| 2008/0235021 A1* | 9/2008 | Cross | G10L 21/06 |
| | | | 704/257 |
| 2009/0112589 A1 | 4/2009 | Hiselius et al. | |
| 2011/0004462 A1* | 1/2011 | Houghton | G10L 15/183 |
| | | | 704/9 |
| 2011/0131042 A1* | 6/2011 | Nagatomo | G10L 15/18 |
| | | | 704/240 |
| 2013/0144597 A1* | 6/2013 | Waibel | G06F 17/28 |
| | | | 704/2 |
| 2013/0144619 A1* | 6/2013 | Lord | G06F 3/165 |
| | | | 704/235 |
| 2013/0238332 A1* | 9/2013 | Chen | G10L 15/183 |
| | | | 704/240 |

* cited by examiner

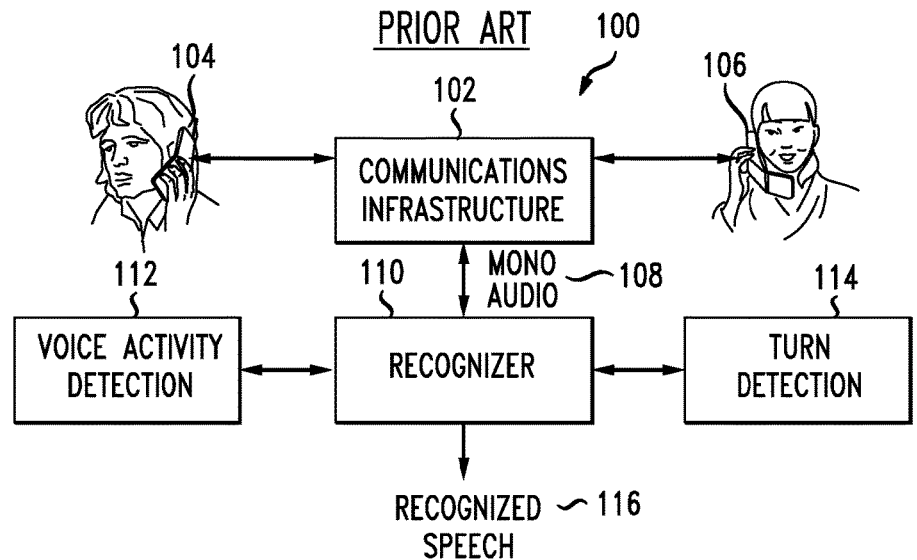
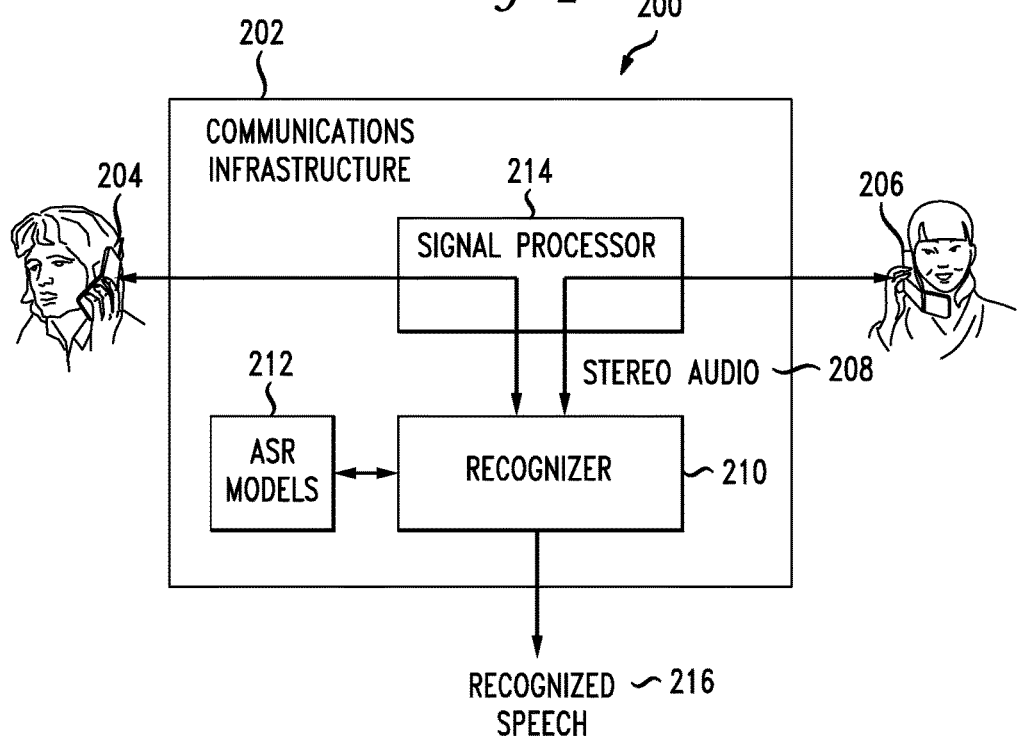

MULTI-CHANNEL SPEECH RECOGNITION

BACKGROUND

1. Technical Field

The present disclosure relates to speech processing and more specifically to recognizing speech from multiple speakers, each in a separate audio channel.

2. Introduction

The market for speech recognition systems is growing quickly, and competition among speech recognizers is becoming more intense. Nevertheless, the accuracy of most speech recognition systems has a lot of room for improvement. Any noticeable improvement in either recognition speed or accuracy or both can become a big selling point. One scenario in which accuracy is lacking is recognizing speech of a conversation between multiple parties, such as during a telephone call. One obstacle in recognizing speech accurately for such a conversation is that speech for each speaker may be best recognized by a tuned recognition model for each speaker, which introduces an element of difficulty in determining which speaker is speaking at any given time. Another option is to use a generic recognition model for both speakers or for more multiple speakers, but this can sacrifice recognition accuracy and/or speed.

FIG. 1 shows an existing prior art approach 100 for recognizing speech from a communication between a first user 104 and a second user 106 via communications infrastructure 102. The communications infrastructure 102 outputs a mono audio signal 108 of the conversation to a recognizer 110 that applies voice activity detection 112, turn detection 114, or similar approaches to sort out when each user is speaking in the mono audio signal 108, and attempts to apply the appropriate recognition model. This approach can be imprecise and computationally intensive because the recognizer 110 may apply the wrong model to portions of the speech in the mono audio signal 108 when generating the recognized speech 116.

Many companies use archives of telephone conversations for analytics, but the conversations are recorded as a mono signal that combines the audio from each speaker of the call into one audio channel. Because of this, the system does not know who is speaking. Automatic techniques can detect dialog turns and divide up the speech into turns, but these techniques are often erroneous. To improve recognition, the system should know which person is speaking before trying to make sense of the speech. Especially if the recognition is personalized for a particular speaker, environment, or codec, accurate knowledge of which person is speaking can reduce error rates significantly, but most of the benefit of personalization disappears and can, in fact, get worse when the system does now know which person is speaking or makes an incorrect guess.

BRIEF DESCRIPTION OF THE DRAWINGS

FIG. 1 illustrates an example prior art speech processing architecture;

FIG. 2 illustrates an example multi-channel speech recognition architecture;

DETAILED DESCRIPTION

Figure 3:
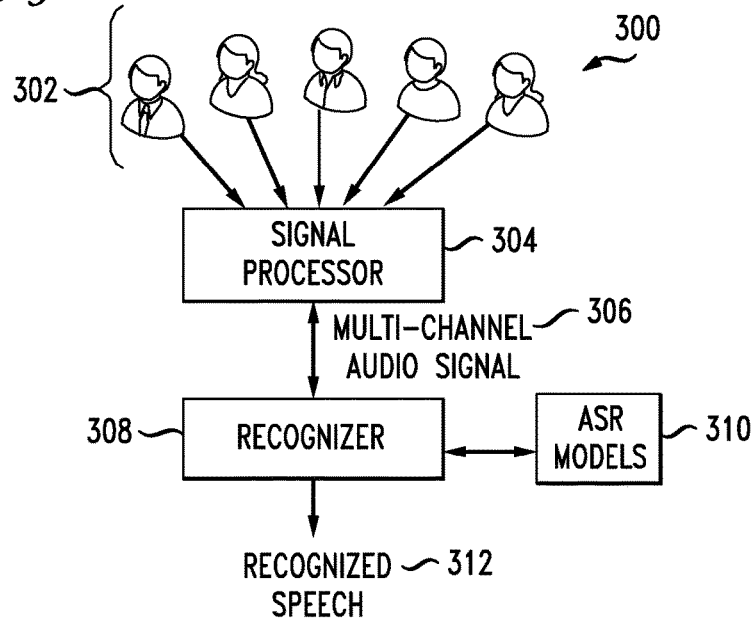
FIG. 3 illustrates an example multi-channel speech recognition architecture with more than two speakers.

A speech recognizer can handle recognition of multi-party audio conversations when speech from different speakers is clearly and unambiguously distinguishable. In this way, the recognizer can apply the proper recognition model to each speaker's speech without errors. Accurate application of the proper speech recognition models can improve recognition accuracy, reduce processing time, and reduce costs associated with speech recognition. The approach disclosed herein can improve accuracy of automatic speech recognition by separating voice channels in the network, one channel per voice party on a call. Then the recognizer can apply custom language or recognition models for each party and leverage vocabulary overlap to prime language models used for the other parties. In other words, an example system can use multi-channel speech recordings to improve the accuracy of automatic speech recognition.

FIG. 2 illustrates an example multi-channel speech recognition architecture 200. The entity operating the communications infrastructure 202 is in a unique position to use the communications infrastructure 202, such as a telephone network, to improve the accuracy of automatic speech recognition for multi-party conversations. Unlike the mono audio signal 108 of FIG. 1, the signal processor 214 in the communications infrastructure 202 can separate channels received from a first speaker 204 and a second speaker 206 into stereo audio 208, with one audio channel per speaker on the call. For example, for a phone call between a customer and a service agent, the signal processor 214 can record what the customer said separately from what the agent said, and can optionally combine those audio channels into a single stereo audio signal 208 for output to the recognizer 210, or can output the audio channels separately to the recognizer 210. The recognizer 210 can then apply the appropriate automatic speech recognition models 212 on a per audio channel basis to generate recognized speech 216. Knowing who is speaking and when that person is speaking can greatly increase the accuracy of automatic speech recognition using personalized acoustic and language models. The recognizer 210 can either switch to the right set of models on every speaker turn, or run a separate automatic speech recognition process for each audio channel. For example, in a stereo audio signal 208, the recognizer 210 can run two parallel automatic speech recognition processes.

In many situations, the vocabulary that call participants use in their speech has a significant overlap. In such cases, the recognizer 210 can use automatic speech recognition results or portions of a recognition model from one speaker to "prime" language model(s) used for other(s). If much better models are available for some speakers than for others, such as in the case of customer service agents vs. customers, the system can prime the language models for customers based on expected vocabulary for the customer service scenario from models for the agents to greatly increase the overall accuracy. In a conversation between an agent and a customer, for example, the recognizer 210 can detect the topic of the conversation and use an appropriate variant of the language model to match that topic. If the recognizer 210 detects that recognition for one of the two speakers is performing below expectations or below some threshold, such as based on confidence scores, then the recognizer 210 can use speech from only one speaker for topic detection, but can adjust the language model for more than just one of the speakers. The recognizer 210 can tune language models for a particular topic, for a particular role in the conversation, such as the role of a customer versus the role of an agent, to increase recognition accuracy.

FIG. 3 illustrates an example multi-channel speech recognition architecture 300 with a group 302 having more than two speakers. In a conference call between five people 302, the signal processor 304 can create five separate recordings and optionally combine the five separate recordings into a multi-channel audio signal 306. This clear separation allows the recognizer 308 to distinguish each speaker, and to determine when each speaker is speaking. This information allows the recognizer 308 to apply the proper automatic speech recognition models 310 to produce recognized speech. The signal processor 304 can be part of a single communication network, or can be distributed among multiple networks.

Figure 4:
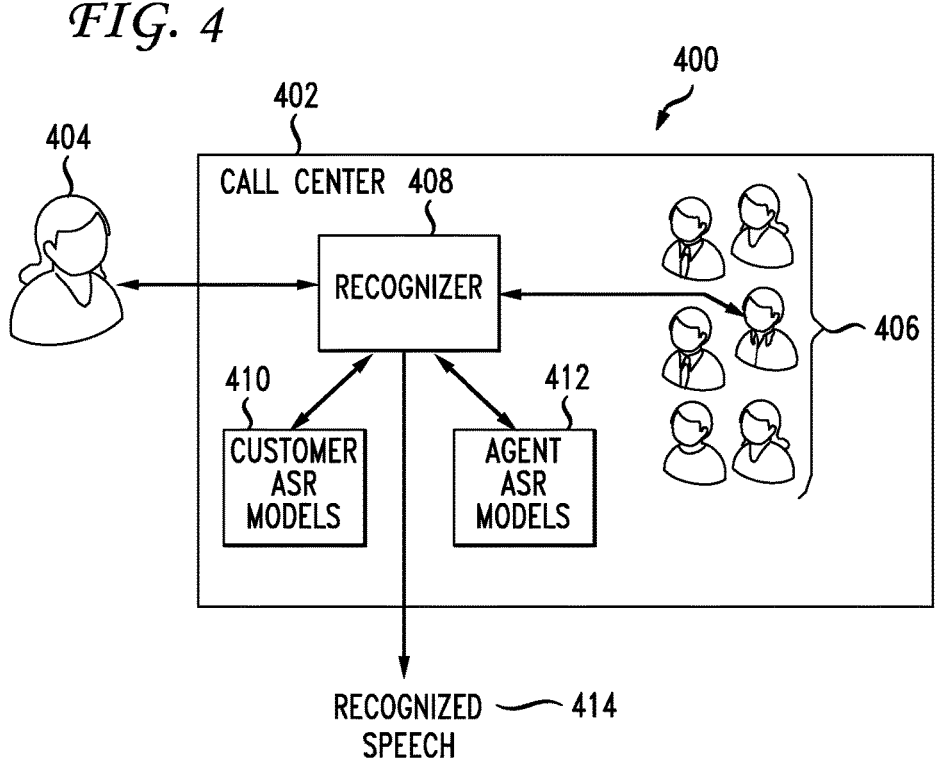
FIG. 4 illustrates an example multi-channel speech recognition architecture as applied to a call center.

FIG. 4 illustrates an example multi-channel speech recognition architecture 400 as applied to a call center 402. In this example, the recognizer 408 receives an audio signal from the caller 404 and from one of the agents 406, and performs automatic speech recognition on a per speaker or per audio channel basis using personalized acoustic and language models. The recognizer 408 is likely to have a significant amount of data and agent models 412 already gathered or generated for the agent 406. The recognizer 408 can apply the appropriate agent speech recognition model 412 to speech from the agent 406. The recognizer 408 can identify which agent model to use based on an identifier for the agent, such as an extension number, an agent login, or some other identifying data. For example, as an agent logs in to his or her telephone and/or computer system, the recognizer 408 can determine that the agent is at that terminal and retrieve a model available for that agent. For new agents, the recognizer 408 can record an hour of agent speech (or some other amount of speech, for example) and process the agent's speech to generate a model. The recognizer 408 can delay generation of the model, such as processing the agent's speech during a low CPU use time. If no model yet exists for the agent, the recognizer 408 can request manual transcription of the agent's speech to increase accuracy when generating the model. This approach can provide a benefit for agent models because agent models are used more frequently in a call center environment. Some agents may have easy to learn speech, while others have speech that is difficult to learn as a recognition model. Thus, the recognizer 408 can request manual transcriptions to assist in generating a recognition model for those with difficult speech patterns.

On the other hand, the recognizer 408 may have a significantly smaller amount of data about the caller 404. The recognizer 408 can attempt to retrieve or populate a customer model 410 based on a key such as a customer number or a telephone number from which the caller is calling, for example. The system can substitute a Skype name, email address, IP address, or other user credentials in place of the telephone number, for example. Often the only information the call center 402 has about the caller 404 is the phone number from which he or she is calling. The recognizer 408 can assume that the bulk of sentences gathered from a particular phone number are from the primary owner of the phone, and can generate a speech model based on those sentences.

To further assist in generating usable recognition models for the caller 404, the recognizer can prime a caller language model with information from an agent language model. For example, in a call center context the recognizer is likely to encounter the same or similar repetitive topics and vocabulary. Thus, the recognizer 408 can prime the caller recognition model 410 with topics or vocabulary from an agent recognition model 412. The recognizer 408 can combine more than just vocabulary. Agent speech generally is easier to recognize because agents typically use the same common phrases and generally are better trained in speaking clearly as part of their job description. Callers often do not know the same phrases and use roundabout ways to describe problems or conditions. Because most callers or customers do not use the right terminology, the recognizer 408 can use a different language model for callers than for agents. Also because of this difference, the recognizer 408 can more heavily weight agent speech for topic determination because the agent is more likely to use consistent, and more clear terminology. The recognizer 408 can generate or identify a best language model by interpolating language models from different sources (agent, customer, wikipedia, newspapers, etc.) with different weights given to various categories: agents, customers, topics (such as billing, tech support, account management), service type (landline phone, cellular phone, DSL, TV, and so forth). Thus, the recognizer 408 can prime a customer model 410 with vocabularies, n-grams, or probabilities that any word in the vocabulary will follow from another model 412. Then the recognizer 408 can take a weighted interpolation of data used as input to prime the customer model 410 and thus tune the customer model 410 in advance for a particular speech recognition domain. For example, the recognizer 408 can tune a primed customer model 410 made with data from other models by assigning a greater weight to data from models that are closer to the desired speech recognition domain.

Figure 5:
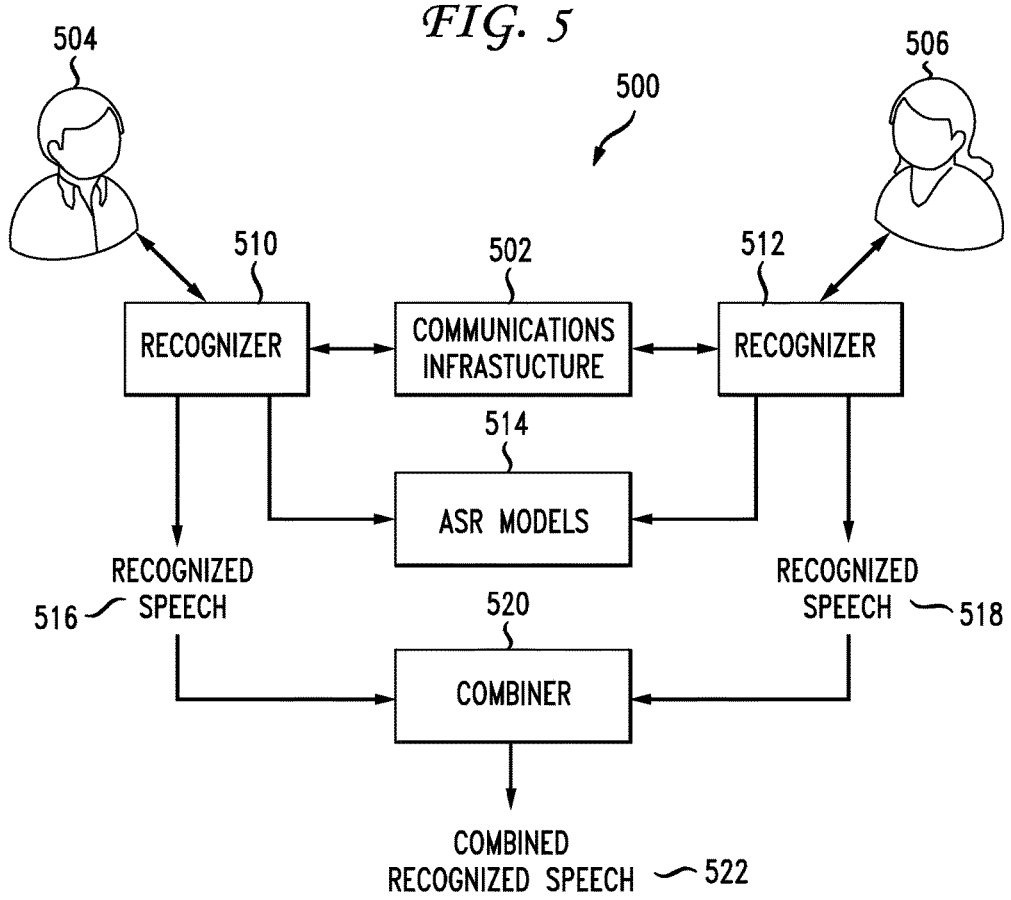
FIG. 5 illustrates an example multi-channel speech recognition architecture with multiple recognizers.

FIG. 5 illustrates an example multi-channel speech recognition architecture 500 with multiple recognizers 510, 512. In this embodiment the communications infrastructure 502 incorporates or communicates with two separate recognizers 510, 512, one for each speaker 504, 506 in a conversation. The separate recognizers 510, 512 can draw from a common set of available recognition models 514 to produce recognized speech 516, 518 for each of the callers. In this way, the audio channels are processed for recognition prior to combination as an audio signal via the communications infrastructure 502. A combiner 520 can combine the speech recognition outputs 516, 518 to produce combined recognized speech 522. This architecture 500 may require additional hardware to maintain and operate the separate recognizers 510, 512 as opposed to a single recognizer 210, 308, 408 as depicted in FIGS. 2-4. The recognizer in any of the embodiments disclosed herein can operate in real time, substantially real time, or as a post-processing task.

The system can attempt to determine who is speaking, and determine whether speech and/or models are already available for that person to avoid re-adapting to his or her speech. If no existing models are available for that person, the system can perform generic speech recognition, estimate the vocal tract length or any other distinguishing characteristic and adapt the generic speech recognition features based on the estimated vocal tract length or other characteristic, and then recognize with the adapted features as a starting point for building, generating, or adapting a customized speech model.

Figure 6:
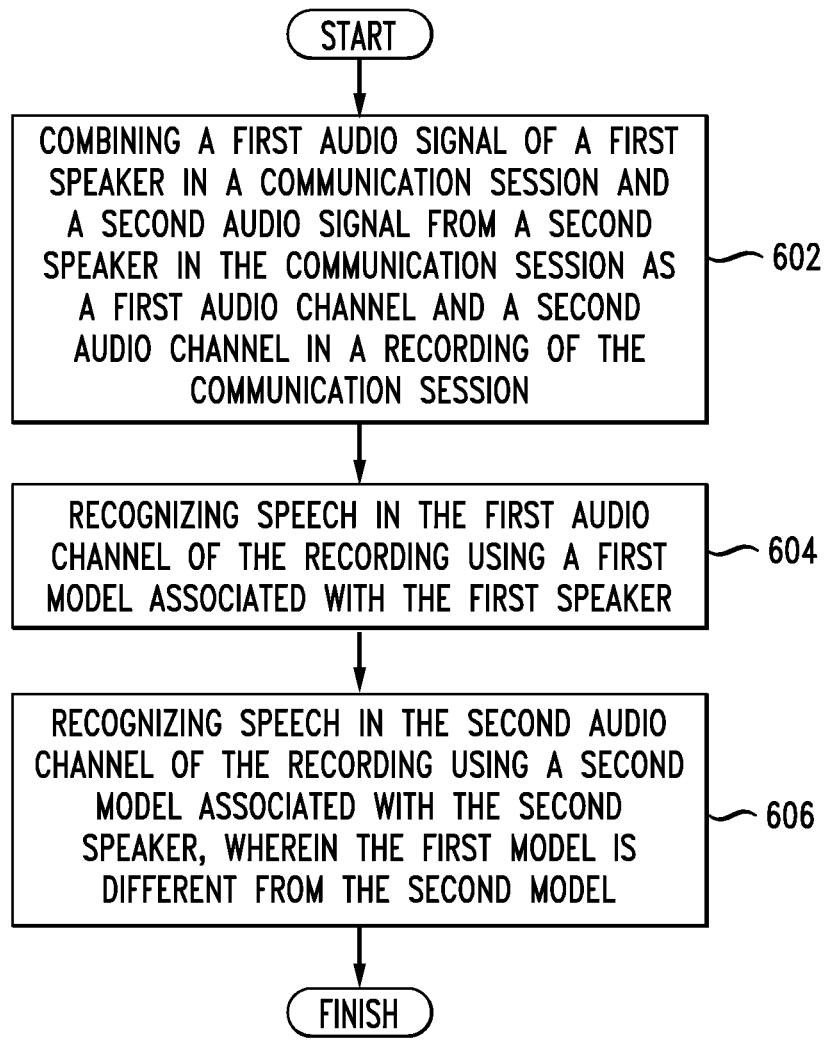
FIG. 6 illustrates an example method embodiment.
Figure 7:
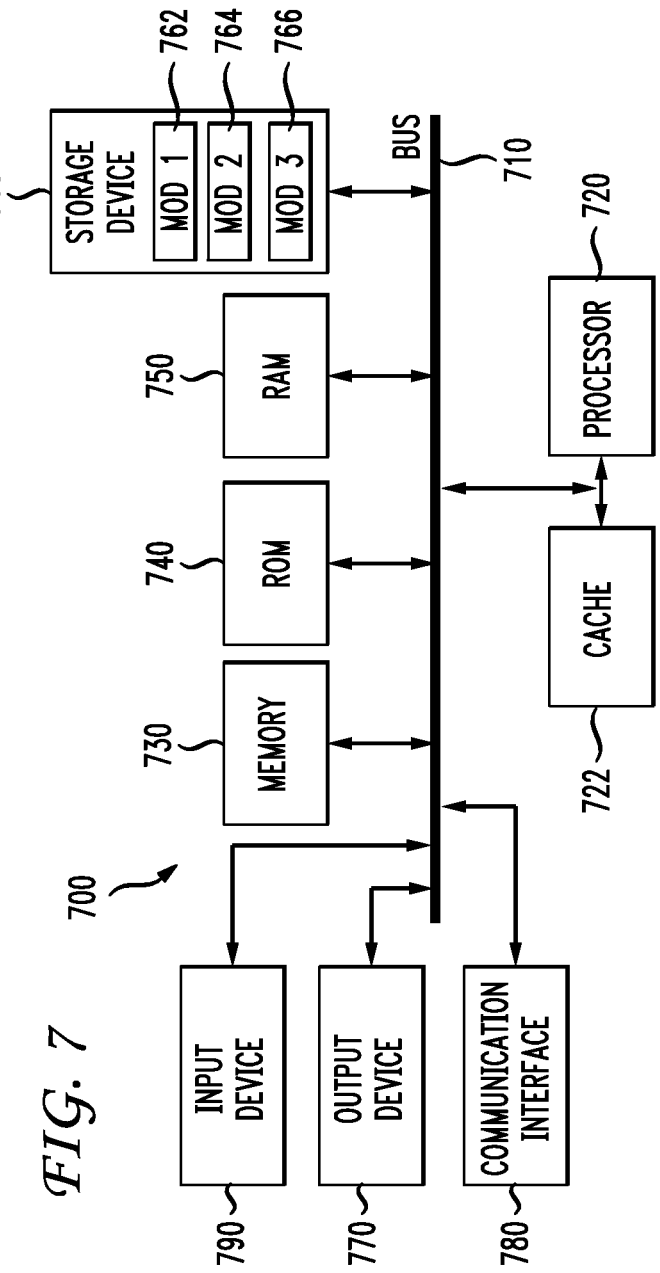
FIG. 7 illustrates an example system embodiment.

Having disclosed some basic system components and concepts, the disclosure now turns to the exemplary method embodiment shown in FIG. 6. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

FIG. 6 illustrates an example method embodiment for performing per-audio-channel automatic speech recognition. The example system combines a first audio signal of a first speaker in a communication session and a second audio signal from a second speaker in the communication session as a first audio channel and a second audio channel, to yield a recording of the communication session (602). The recording of the communication session can be a dual or multi-channel audio recording of a telephone call, for example. The communication session can include telephone calls, whether over a plain old telephone system (POTS) line or a voice over IP (VoIP) connection, as well as audio from a video chat, or audio from an audio conference. The recording has at least two audio channels, and separates speakers in different audio channels. In a simple variation illustrating how the recording is separated, each respective speaker's speech is contained in a separate audio channel in the recording. In an alternative embodiment, the system receives an already combined audio of the two channels. While this example is described in terms of two audio channels, the system can be extended to apply to more audio channels for more speakers. The first audio signal is typically received from a first telecommunications terminal of the first speaker, and the second audio signal is received from a second telecommunications terminal of the second speaker. The telecommunications terminal can be a desktop, laptop, or tablet computing device, a desk phone, a voice of IP client device, a smartphone, a feature phone, or any other type of telephony device, or any other device which provides for audio communication between speakers.

The system can recognize speech in the first audio channel of the recording using a first model associated with the first speaker (604), and can recognize speech in the second audio channel of the recording using a second model associated with the second speaker, wherein the first model is different from the second model (606). The system can identify when the first speaker is speaking based on voice activity detection performed on the first audio channel, and the system can identify when the second speaker is speaking based on voice activity detection performed on the second audio channel.

The system can identify the first model based on an identifier of the first speaker, and likewise identify the second model based on an identifier of the second speaker. The identifier can be, for example, a telephone number, an IP address, a customer number, or an account number. The system can use other appropriate identifiers. The first model and the second model can be acoustic models or language models.

The system can then further generate recognized speech as an output from the communication session in step (602). The system can generate separate recognized speech for the first speaker and the second speaker, or can combine the recognized speech into a single output result.

In a different embodiment, the system can receive audio having a first audio channel of speech from a first speaker and a second audio channel of speech from a second speaker. The system can identify a first speech recognition model for the first speaker, and identify a second speech recognition model for the second speaker. Then, based on voice activity detection, the system can apply the first speech recognition model to the audio when the voice activity detection is positive in the first audio channel, and apply the second speech recognition model to the audio when the voice activity detection is positive in the second audio channel.

The system can cache the first speech recognition model and the second speech recognition model, and switch between a cached first speech recognition model and a cached second speech recognition model to recognize speech in the audio. The system can identify a first speech recognition model for the first speaker by retrieving, from a database of speech recognition models, the first speech recognition model based on a unique identifier associated with the first audio channel. The system can generate speech recognition output from applying the first speech recognition model and the second speech recognition model to the audio on a per-channel basis, one model for each channel. When the first and second models are acoustic models, the system can apply a common language model to the first audio channel and the second audio channel while using separate first and second acoustic models for each audio channel.

In yet another embodiment, the system can prime a model for one audio channel with information from another audio channel. The system can receive audio having a first audio channel of speech from a first speaker and a second audio channel of speech from a second speaker, and identify a first speech recognition model for the first speaker. The system can prime a second speech recognition model for the second speaker with data from the first speech recognition model. Then, based on per-channel voice activity detection, the system can apply the first speech recognition model to the audio when the voice activity detection is positive in the first audio channel, and applying the second speech recognition model to the audio when the voice activity detection is positive in the second audio channel. The system can determine, prior to priming the second speech recognition model, that the first speech recognition model is more developed, complete, or task- or speaker-appropriate than the second speech recognition model, based on factors such as vocabulary size, accuracy of recognition results, subjective ratings, or a completeness score providing a quantifiable value indicating how much training data has been processed to consider the model 'complete' for a given purpose or for a given speaker.

The techniques described herein can lead to much more accurate speech recognition, which in turn can lead to much more accurate speech analytics. The speech recognition output can provide transcription services for a call center. The speech recognition output can serve as records of the contents of a call, or for analytics, or for augmenting training data for acoustic model or language model training in unsupervised or partially unsupervised training, for example. The output can be used for quality control purposes in a call center, to evaluate agents' responses. Similarly, recognized speech from a caller in a call center can be processed to recognize words that indicate heightened emotions, frustration, or anger of a caller. Upon recognizing such events, the system can prompt a call center agent or an automated service to bring in a customer care specialist, for example, or perform some other customer care task.

Various embodiments of the disclosure are described in detail herein. While specific implementations are described, it should be understood that this is done for illustration purposes only. Other components and configurations may be used without parting from the spirit and scope of the disclosure. A brief description of a basic general purpose system or computing device in FIG. 7 which can be employed to practice the concepts, methods, and techniques disclosed is illustrated.

An exemplary system and/or computing device 700 includes a processing unit (CPU or processor) 720 and a system bus 710 that couples various system components including the system memory 730 such as read only memory (ROM) 740 and random access memory (RAM) 750 to the processor 720. Some example systems can include a desktop or laptop computer, a server, a wireless device such as a feature phone, a smartphone, or a tablet computing device. The system 700 can include a cache of high speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 7 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage media or devices provide non-volatile storage of computer-readable instructions, data structures, program modules and other data for the computing device 700. In one aspect, a hardware module that performs a particular function includes the software component stored in a tangible computer-readable storage medium or device in connection with the necessary hardware components, such as the processor 720, bus 710, display 770, and so forth, to carry out a particular function. In another aspect, the system can use a processor and computer-readable storage medium or device to store instructions which, when executed by the processor, cause the processor to perform a method or other specific actions. The basic components and appropriate variations can be modified depending on the type of device, such as whether the device 700 is a small, handheld computing device, a desktop computer, or a computer server.

Although the exemplary embodiment(s) described herein employs the hard disk 760, other types of computer-readable media or storage devices which can store data that are accessible by a computer, such as magnetic cassettes, flash memory cards, digital versatile disks, cartridges, random access memories (RAMs) 750, or read only memory (ROM) 740, may also be used in the exemplary operating environment. Computer-readable storage devices, or computer-readable memory devices, expressly exclude signals such as transitory waves and carrier signals.

To enable user interaction with the computing device 700, an input device 790 represents any number of input mechanisms, such as a microphone for speech, a touch-sensitive screen for gesture or graphical input, a keyboard, a mouse, a motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. Illustrative embodiments may include microprocessor and/or digital signal processor (DSP) hardware, read-only memory (ROM) 740 for storing software performing the operations described below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in any of the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

Embodiments within the scope of the present disclosure may also include tangible computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, smart phones, feature phones, tablet computing devices, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to produce much more accurate speech recognition in situations where speakers can be divided into audio channels, and can also be applied to generate more accurate speech analytics. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving a recording of a communication session, wherein the communication session comprises a first audio channel and a second audio channel, the first audio channel containing a first audio signal of a first speaker in the communication session and the second audio channel containing a second audio signal from a second speaker in the communication session, wherein the first speaker is distinct from the second speaker;
selecting a first, speech recognition model specific to a first speaker identity of the first speaker and based on a first speaker identifier comprising one of a telephone number, an IP address, a customer number arid an account number;
selecting a second speech recognition model specific to a second speaker identity of the second speaker, wherein the first speech recognition model is distinct from the second speech recognition model;
recognizing, via a processor configured to perform speech recognition, first speech from the first speaker using the first speech recognition model;
recognizing, via the processor, second speech from the second speaker using the second speech recognition model;
detecting, via the processor, a topic of the communication session;
adjusting, based on the topic of the communication session and a characteristic of the first speaker, the first speech recognition model to yield an adjusted first speech recognition model: and
adjusting, based on the topic of the communication session and a characteristic of the second speaker, the second speech recognition model to yield an adjusted second speech recognition model, wherein the adjusted first speech recognition model is used to recognize first additional speech from the first speaker and the adjusted second speech recognition model is used to recognize second additional speech from the second speaker.

2. The method of claim 1., further comprising:
generating recognized speech as an output from the communication session.

3. The method of claim 1, wherein the identifier further comprises a job title.

4. The method of claim 1, further comprising:
identifying when the first speaker is speaking based on voice activity detection performed on the first audio channel; and
identifying when the second speaker is speaking based on voice activity detection performed on the second audio channel.

5. The method of claim 1, wherein the first speech recognition model is generated by interpolating a plurality of language models with different weights given to specific categories.

6. A system comprising:
a processor configured to perform speech recognition; and
a computer-readable storage device storing instructions which, when executed by the processor, cause the processor to perform operations comprising:
receiving a recording of a communication session, wherein the communication session comprises a first audio channel and a second audio channel, the first audio channel containing a first audio signal of a first speaker in the communication session and the second audio channel containing a second audio signal from a second speaker in the communication session, wherein the first speaker is distinct from the second speaker;
selecting a first speech recognition model specific to a first speaker identity of the first speaker and based on a first speaker identifier comprising one of a telephone number, an IP address, a customer number and an account number;
selecting a second speech recognition model specific to a second speaker identity of the second speaker, wherein the first speech recognition model is distinct from the second speech recognition model;
recognizing first speech from the first speaker using the first speech recognition model;
recognizing second speech from the second speaker using the second speech recognition model;

detecting a topic of the communication session;

adjusting, based on the topic of the communication session and a characteristic of the first speaker, the first speech recognition model to yield an adjusted first speech recognition model: and adjusting, based on the topic of the communication session and a characteristic of the second speaker, the second speech recognition model to yield an adjusted second speech recognition model, wherein the adjusted first speech recognition model is used to recognize first additional speech from the first speaker and the adjusted second speech recognition model is used to recognize second additional speech from the second speaker.

7. The system of claim 6, the computer-readable storage device having additional instructions stored which, when executed by the processor, cause the processor to perform operations comprising:

caching the first speech recognition model and the second speech recognition model.

8. The system of claim 7, the computer-readable storage device having additional instructions stored which, when executed by the processor, cause the processor to perform operations comprising:

switching between the first speech recognition model and a cached speech recognition model to recognize the first speech in the recording.

9. The system of claim 6, wherein each of the first speech recognition model and the second speech recognition model comprises one of an acoustic model and a language model.

10. The system of claim 6, wherein selecting the first speech recognition model specific to the first speaker identity of the first speaker further comprises:

retrieving, from a database of speech recognition models, the first speech recognition model based on a unique identifier specific to the first speaker.

11. The system of claim 6, the computer-readable storage device having additional instructions stored which, when executed by the processor, cause the processor to perform operations comprising:

generating speech recognition output from applying the first speech recognition model and applying the second speech recognition model to the recording.

12. The system of claim 6, wherein each of the first speech recognition model and the second speech recognition model is an acoustic model, and wherein the operations further comprise:

applying a common language model to the first audio channel and the second audio channel.

13. A computer-readable storage device storing instructions which, when executed by a computing device configured to perform speech recognition, cause the computing device to perform operations comprising:

receiving a recording of a communication session, wherein the communication session comprises a first audio channel and a second audio channel, the first audio channel containing a first audio signal of a first speaker in the communication session and the second audio channel containing a second audio signal from a second speaker in the communication session, wherein the first speaker is distinct from the second speaker;

selecting a first speech recognition model specific to a first speaker identity of the first speaker and based on a first speaker identifier comprising one of a telephone number, an IP address, a customer number and an account number;

selecting a second speech recognition model specific to a second speaker identity of the second speaker, wherein the first speech recognition model is distinct from the second speech recognition model;

recognizing first speech from the first speaker using the first speech recognition model;

recognizing second speech from the second speaker using the second speech recognition model;

detecting a topic of the communication session adjusting, based on the topic of the communication session and a characteristic of the first speaker, the first speech recognition model to yield an adjusted first speech recognition model; and adjusting, based on the topic of the communication session and a characteristic of the second speaker, the second speech recognition model to yield an adjusted second speech recognition model, wherein the adjusted first speech recognition model is used to recognize first additional speech from the first speaker and the adjusted second speech recognition model is used to recognize second additional speech from the second speaker.

14. The computer-readable storage device of claim 13, having additional instructions stored which, when executed by the computing device, cause the computing device to perform operations comprising:

determining that the first speech recognition model is more developed than the second speech recognition model; and based on the determining, priming the second speech recognition model with additional words.

15. The computer-readable storage device of claim 14, wherein the determining that the first speech recognition model is more developed than the second speech recognition model is based on at least one of vocabulary size, accuracy of recognition results, subjective ratings, and a completeness score.

16. The computer-readable storage device of claim 14, wherein the priming the second speech recognition model comprises copying part of the first speech recognition model into the second speech recognition model.

\* \* \* \* \*